United States Patent [19]

Namiki

[11] 4,236,635

[45] Dec. 2, 1980

[54] FILING SHEET FOR MICROSCOPE SLIDES

[75] Inventor: Naokuni Namiki, Hoya, Japan

[73] Assignee: Slidex Corporation, Tokyo, Japan

[21] Appl. No.: 44,751

[22] Filed: Jun. 1, 1979

[30] Foreign Application Priority Data

Jun. 2, 1978 [JP] Japan .............................. 53-75673[U]
Jun. 2, 1978 [JP] Japan .............................. 53-75674[U]

[51] Int. Cl.³ .......................... B65D 1/24; B65D 5/50; B65D 85/62
[52] U.S. Cl. .................................... 206/456; 206/518; 206/564
[58] Field of Search ............... 206/456, 455, 449, 518, 206/564

[56] References Cited

U.S. PATENT DOCUMENTS

| | | | |
|---|---|---|---|
| 2,968,882 | 1/1961 | Ozeki | 206/456 |
| 3,589,511 | 6/1971 | Britt | 206/518 |
| 3,743,081 | 8/1973 | Roberg et al. | 206/387 |

FOREIGN PATENT DOCUMENTS

| | | | |
|---|---|---|---|
| 286952 | 12/1966 | Australia | 206/456 |
| 566747 | 9/1975 | Switzerland | 206/456 |

*Primary Examiner*—William T. Dixson, Jr.
*Attorney, Agent, or Firm*—Fleit & Jacobson

[57] ABSTRACT

A filing sheet for microscope slides comprising;

a unitary rotary plastic sheet having a plurality of rectangular recesses depressed from the outer periphery and spaced apart by longitudinal partition wall and lateral partition wall in lateral and longitudinal relationship, each of said rectangular recesses being defined by a pair of side walls of longitudinal partition walls and a pair of lateral partition walls for receiving a microscope slide;

microscope slide-retaining means projected inwardly into said rectangular recess from a pair of side walls of said opposing longitudinal partition walls and having a space for inserting a microscope slidebetween the end of said slide-retaining means and an opposite lateral partition walls;

an air-ventilation opening provided on the side portion of the plane of said rectangular recesses under said slide-retaining means;

fingertip recesses provided in the borderline of said adjacent rectangular recesses and protruded downwardly from the plane of said rectangular recess;

upraised projection means arranged on the bottom of each of said rectangular recesses for abutting said microscope slide and holding said microscope slide in contact with said microscope slide-retaining means;

spacer means protruded downwardly from end portion of the back surface of bottom wall of said rectangular recess; and a plurality of lateral partition walls projected inwardly toward said fingertip recess and having a substantially same protrusion height with the microscope slide-retaining means.

The filing sheet for microscope slides is available to put on to slide projctor directly without any change of arrangement of slide and to reserve the slides in upset position and to hold at the hanging position in the reservoir and to secure the slides at any position or shocking.

12 Claims, 6 Drawing Figures

FILING SHEET FOR MICROSCOPE SLIDES

BACKGROUND OF THE INVENTION

This invention relates to a filing sheet for microscope slides.

As a filing means for microscope slides, there has been prevailingly used a wooden case, the internal space of which is divided by lateral and longitudinal walls into a plurality of sections for receiving therein microscope slides.

Such a wooden case, however, is nowadays costly, because of an increased manufacturing cost as well as an increased cost of a raw wood material. On the other hand, the wooden case is bulky and inconvenient to handle. Since an individual section of the wooden case usually has a depth several times the thickness of a microscope slide, there results in a difficulty at the time of insertion or removal of a microscope slide into or from each section, as well as a difficulty in probing a desired microscope slide. Furthermore, most of such wooden cases has not stopper means in each section, with a likelihood of a microscope slide being easily slipped off from a section, if such a wooden case is tilted.

As the prior arts, U.S. Pat. No. 3,746,161 (Jones) and U.S. Pat. No. 3,777,885 (Barteck) are known as a holder for microscopic slide. However, Jones only teaches a tray-like holder for accommodating a plurality of plate-like elongated flat rectangular microscope slide in side-by-side spaced relation, while Jones fails to disclose a filing sheet for microscope slides so as to secure the slide in upset position or to hold at the hanging position in the reservoir.

While, the present invention is to provide a filing sheet for microscope slide which is available to put on to a slide projector directly without any change of arrangement of slides and to reserve the slide in upset position or to hold at the hanging position in the reservoir.

Barteck teaches a molded plastic article handling tray, while Barteck fails to discloses a filing sheet for microscope slide which is available directly to put it on the slide projector for viewing the sample secured on said microscope slide with cover glass. Barteck also fails to disclose slide retaining means which can secure the slide at any position or shocking.

SUMMARY OF THE INVENTION

The present invention is to provide a filing sheet for microscope slides, wherein a number of microscope slides are held in laterally and longitudinally spaced relationship on the same plane of an integral sheet, comprising:

a unitary plastic sheet having a plurality of rectangular recesses depressed from the outer periphery and spaced apart by longitudinal partition wall and lateral partition wall in lateral and longitudinal relationship, each of said rectangular recesses being defined by a pair of longitudinal partition walls and a pair of lateral partition walls for receiving a microscope slide;

microscope slide-retaining means projected inwardly into said rectangular recess from a pair of side walls of said opposing longitudinal partition walls and having a space for inserting a microscope slide between the end of said slide-retaining means and an opposite lateral partition walls;

an air-ventilation opening provided on the side portion of the plane of said rectangular recesses under said slide-retaining means;

fingertip recesses provided in the borderline of said adjacent rectangular recesses and protruded downwardly from the plane of said rectangular recess;

upraised projection means arranged on the bottom of each of said rectangular recesses for abutting said microscope slide and holding said microscope slide in contact with said microscope slide-retaining means;

spacer means protruded downwardly from end portion of the back surface of bottom wall of said rectangular recess; and a plurality of lateral partition walls projected inwardly toward said fingertip recess and having a substantially same protrusion height with the microscope slide-retaining means.

An object of the present invention is to provide a filing sheet for microscope slide wherein said spacer has longer length than the fingertip recess to prevent contact of lower end of the fingertip recess with the upper surface of a lower microscope slide of a larger size when two or more filing sheets are stacked in a superposed fashion and at least one microscope slide of larger size is retained in a lower filing sheet.

Another object of the present invention is to provide a filing sheet for microscope slide which comprises severable means in said lateral partition wall for cutting off the inwardly projected portion toward the fingertip recess.

A further object of the present invention is to provide a filing sheet for microscope slide wherein a plurality of lateral partition walls have machine stitches, streaks, stripes, grooves, pressed forms, to facilitate separation thereof from the plastic sheet.

A still further object of the present invention is to provide a filing sheet for microscope slide wherein said fingertip recess is as deep as being fitted in a fingertip recess of a lower filing sheet when two or more filing sheets are stacked in a superposed fashion.

Another object of the present invention is to provide a filing sheet for microscope slide wherein the filing sheet further comprises two or more positioning members provided in desired portions of said filing sheet and adapted to engage the back surface of an upper filing sheet when two or more filing sheets are stacked in a superposed fashion.

A further object of the present invention is to provide a filing sheet for microscope slide wherein said microscope slide-retaining means has elastic force sufficient to retain said microscope slide in said rectangular recess with said upraised projection means.

A still further object of the present invention is to provide a filing sheet for microscope slide wherein said microscope slide-retaining means are arranged so as to be inclined downwardly toward the bottom of the rectangular recess.

Other objects and features of the present invention will be apparent from the ensuing part of the specification in conjunction with the accompanying drawings which indicate preferred embodiments of the present invention.

DESCRIPTION OF PREFERRED EMBODIMENTS

Figure 1:
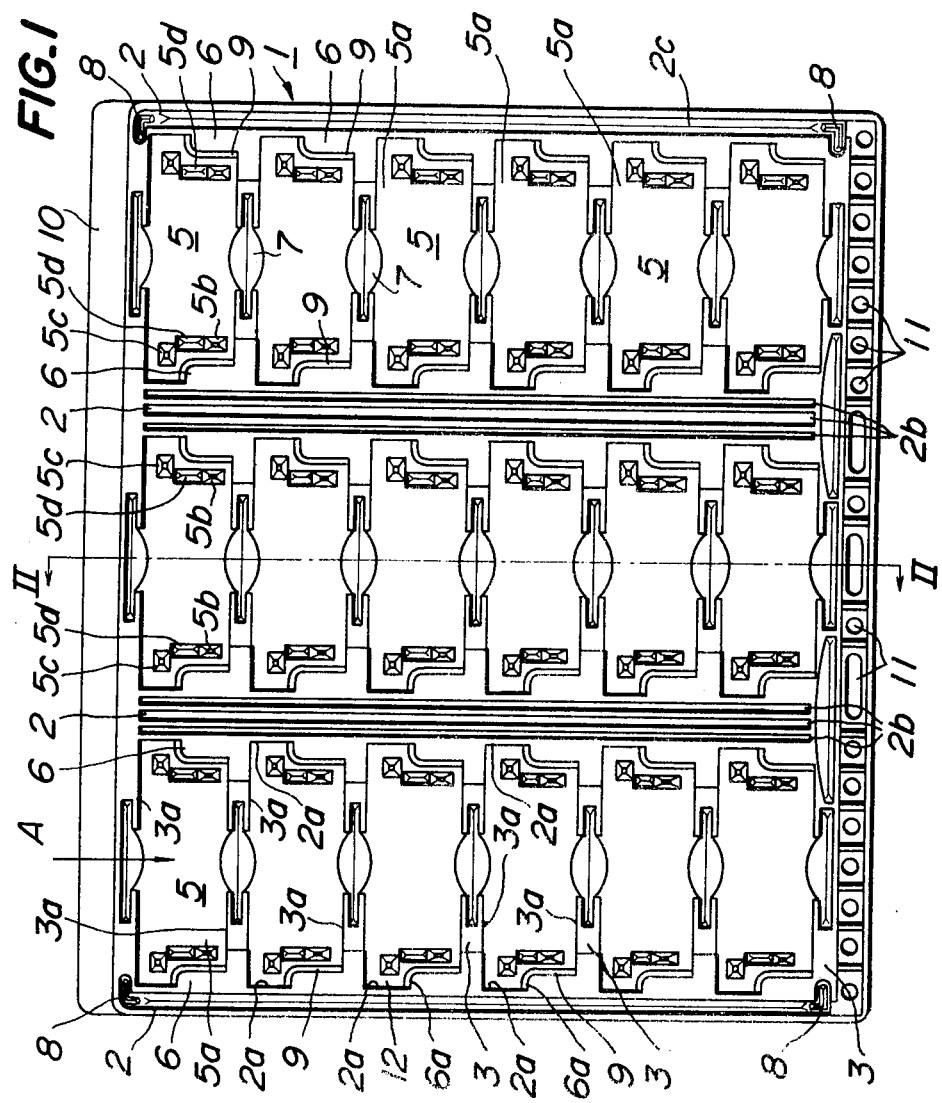
FIG. 1 is a plan view of one embodiment of the present invention.
Figure 2:
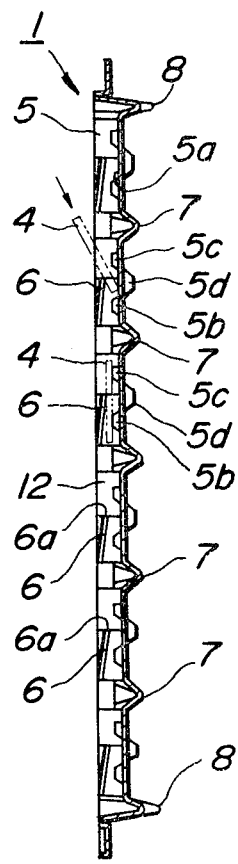
FIG. 2 is a cross-sectional view taken along the line II—II of FIG. 1.
Figure 3:
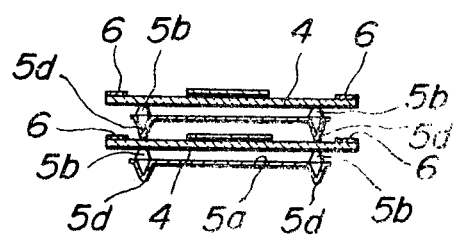
FIG. 3 is a partial cross-sectional view of filing sheets of the present invention stacked in a superposed fashion.

FIGS. 1-3 illustrate an embodiment of the present invention. In FIGS. 1-3, numeral 1 shows a filing sheet for microscope slides formed by pressing from one sheet according to the present invention, numeral 2 a longitudinal partition wall, numeral 3 a lateral partition wall, numeral 4 a microscope slide, numeral 5 a plurality of rectangular recesses spaced apart by longitudinal partition wall and lateral partition wall in lateral and longitudinal relationship and each rectangular recess is defined by a pair of side walls of said longitudinal and lateral partition walls and having a configuration and a depth large enough to receive therein a microscope slide 4, and numeral 6 a pair of microscope slide-retaining means projected inwardly into each rectangular recess from a pair of side walls of said opposing longitudinal partition walls which define each rectangular recess 5. The pairs of side walls of longitudinal partition walls 2a, 2a and lateral partition walls 3a, 3a considerably restrict displacement of microscope slide 4 within rectangular recess 5 in a plane parallel to rectangular recess 5.

Each rectangular recess 5 is defined by side walls 2a of longitudinal partition walls 2 and side wall 3a of lateral partition walls 3, and each microscope slide-retaining means 6 projected inwardly from said longitudinal partition wall 2 toward fingertip recess 7 provided in the borderline between adjacent rectangular recesses, and have a substantially same protrusion height with the top plane of side wall 2a. The air-ventilation opening 9 is formed by punching or pressing of a portion of rectangular recess 5 under the portion of said microscope slide-retaining means 6.

Microscope slide-retaining means 6 shown in the embodiment is connected with projection of lateral partition wall 3a at the rear end thereof in order to provide a required strength. The front end of said microscope slide-retaining means 6 is spaced apart from the opposing side wall 3a so as to insert the microscope slide 4 in each rectangular recess 5 in a direction of arrow in FIG. 2.

A pair of microscope slide-retaining means 6 hold the microscope slide 4 by their own elasticity, and are preferably inclined downwardly to some extent toward their front ends, as seen in FIG. 2. By the provision of microscope slide-retaining means 6, the microscope slide 4 may be firmly secured in each rectangular recess 5, without a risk of slipping off eventually, even if filing sheet 1 is roughly handled at any position or shocked or held at the hanging position in their reservoir.

The fingertip recesses 7 are provided in the borderline of said adjacent rectangular recesses 5 and protruded downwardly from the plane of said rectangular recess 5. These fingertip recesses 7 make it easy for a user to take out the desired microscope slide 4 held in rectangular recess 5 on filing sheet 1 by one's fingertips. When two or more filing sheets 1 are stacked or bound, if fingertip recess 7 is sufficiently deep enough to fit in a fingertip recess 7 of a lower filing sheet, fingertip recess 7 serves as a positioning member, and allows a plurality of filing sheets to be held compactly when these filing sheets are bound into an album. When a plurality of filing sheets 1 are put in a stacked fashion, such fingertip recesses 7 prevent these filing sheets from being slipped off due to misalignment thereof.

Reference numeral 8 is another positioning member protruded downwardly and arranged at corner portions of filing sheet 1 and the downwardly protruded length of positioning member 8 is longer than either of fingertip recess 7 and spacer 5d. The positioning member 8 is adapted to securely engage within a positioning member 8 of a lower filing sheet 1 when two or more filing sheets are stacked, and achieves the same function as the fingertip recess 7. When filing sheets 1 without microscope slides 4 are stacked in a superposed fashion, positioning member 8 functions together with fingertip recess 7 and spacer 5d to allow compact and formulated storage of the filing sheets 1.

A bottom plane 5a of each rectangular recess 5 is formed with two couples of upraised projections 5b and 5c at the outside area of the viewing scope of respective microscope slide. A spacing between the front end 6a of slide-retaining means 6 and the side wall 3a of lateral partition wall 3 is sufficient enough to insert a microscope slide 4 into a gap between microscope slide-retaining means 6 and bottom plane 5a of each rectangular recess 5 as seen in FIG. 2, so that microscope slide 4 can be inserted in rectangular recess 5 by holding the lateral edges thereof by fingertips, in a manner to incline the microscope slide 4 arcuately. Respective upraised projections 5b and 5c act to space the microscope slide 4 inserted into the rectangular recess 4 and to hold it in cooperation with microscope slide-retaining means 6, thereby the microscope slide 4 is firmly secured at any position or shocking or held at the hanging position in the reservoir or reserved the slide in upset position.

A filing sheet in the embodiment shown in FIGS. 1-3 is further provided with downwardly projected spacer means 5d at the outside area of the viewing scope of microscope slide. Besides, if filing sheet 1 is made of a transparent or translucent plastic sheet, prepared samples can readily be inspected and observed without any hindrance even when filing sheet 1 is held to a light to look through or filing sheet 1 retaining microscope slides as it is directly projected for example by overhead-projector. By providing the spacer means 5d, the bottom plane 5a of a rectangular recess 5 does not abut directly upon the upper surface of a microscope slide 4 of a lower filing sheet 1 and there is a space between the bottom plane 5a of the rectangular recess 5 and the upper surface of the lower microscope slide 1. This structure serves as a mechanical shock absorber to protect a microscope slide 4 from a breakage or damage, and allows air ventilation through the air ventilation opening 9 during light projection of slide to protect the overheat of the microscope slide 4 and the filing sheet 1 and prevents a newly prepared microscope slide 5 wherein cover glass is not yet completely cured or settled from displacement or contamination.

An index portion 10 is provided in one marginal portion of filing sheet 1, and binding holes 11 for binding filing sheets 1 together thereto are provided in the other marginal portion of filing sheet opposite to the index portion 10 as shown in FIG. 1.

Index portion 10 is useful for probing a desired microscope slide from a number of microscope slides 4 held in rectangular recesses 5 in filing sheet 1, when a mark, title or the like is written thereon or attached thereto. If filing sheet 1 is made of a transparent or translucent plastic sheet, the probing of the desired microscope slide from a number of microscope slides 4 is readily effected only by holding filing sheet 1 to a light to look through the filing sheet. Further, in case that a specific microscope slide 4 is removed from one rectangular recess 5 and rectangular recess 5 is left to be unoccupied for a long period of time, if memorandum items for future reference are written on the bottom plane of that recess 5 or memorandum card is inserted in the recess 5, the missing of that microscope slide can be avoided. Binding holes 11 are utilized when a number of filing sheets are bound at one side by a fastening means with a cover sheet to form an album.

When it is desired to hold microscope slide 4 made of glass or plastics in rectangular recess 5 or to take out it from said recess 5 in filing sheet 1, it is recommendable to insert or remove slide glass 4 in or from the rectangular recess 5 while lifting to some extent a portion of that slide glass 4 which is to be located below microscope slide-retaining means 6 when inserted in the recess 5, so that respective components of filing sheet 1 does not suffer from wear due to friction of the edges of microscope slide 4 relative thereto. Slide glass 4, when inserted in rectangular recess 5, only contacts projections 5b and 5c of microscope slide-retaining means 6, and an air-ventilation opening 9 resulting from the punching of microscope slide-retaining means 6 serves as an air-ventilation opening to allow air to flow to the back surface of microscope slide 4 through the air-ventilation opening 9. This contributes to preventing a change in quality of a material placed by sampling on the microscope slide 4, due to moisture, mold and other factors, and to effectively preventing breakage of microscope slide, because shock given to bottom plane 5a of rectangular recess 5 is not directly transmitted to microscope slide 4.

Figure 4:
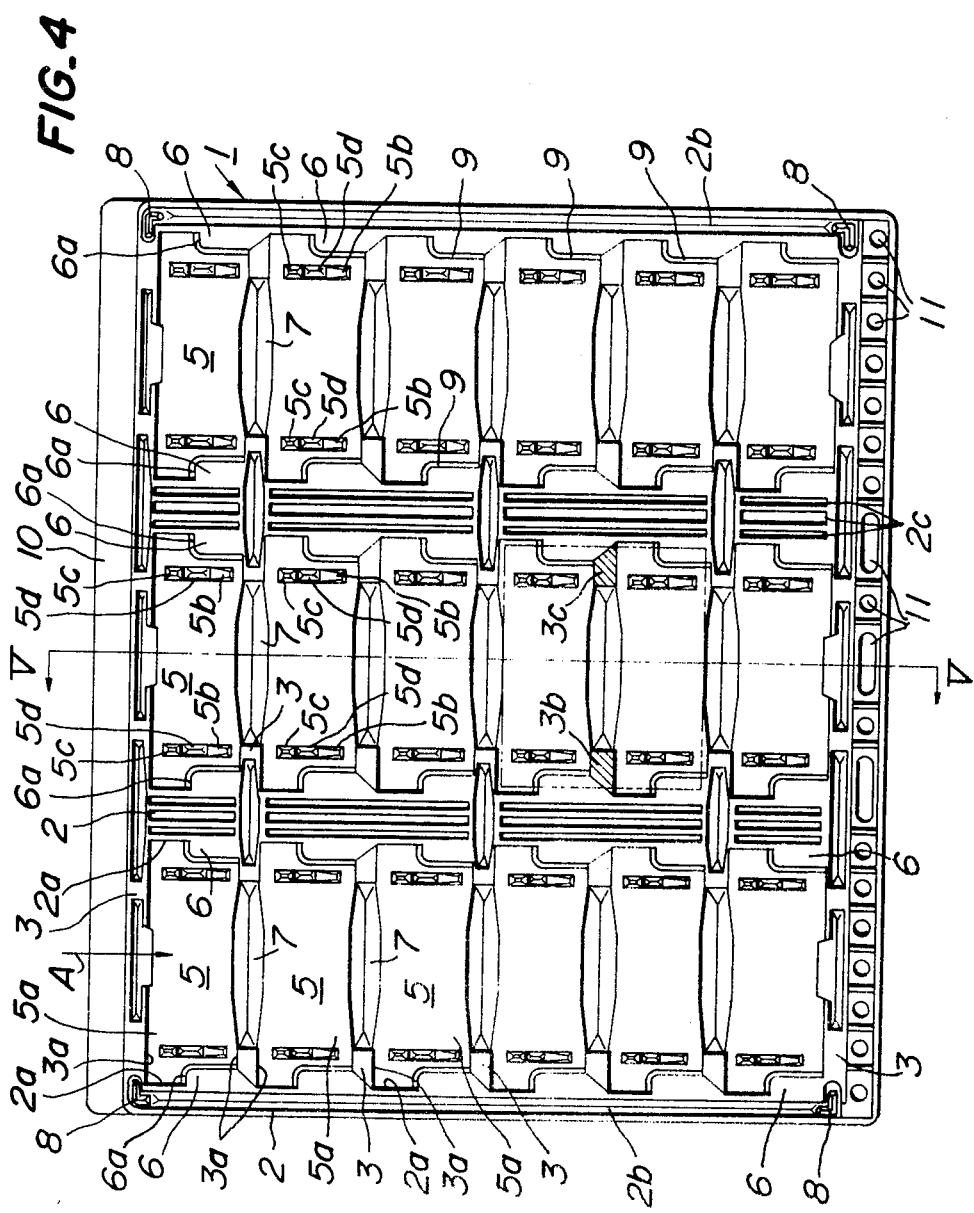
FIG. 4 is a plan view of another embodiment of the present invention.
Figure 5:
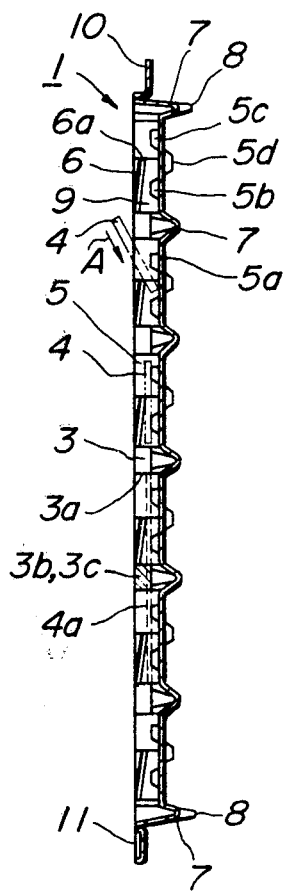
FIG. 5 is a cross-sectional view taken along the line V—V of FIG. 4.
Figure 6:
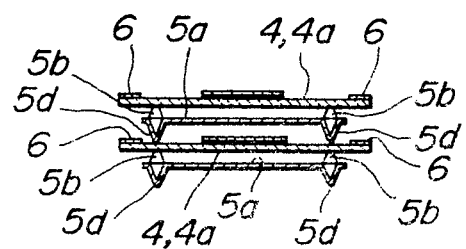
FIG. 6 is a partial cross-sectional view of filing sheets of the present invention stacked in a superposed fashion.

FIGS. 4-6 illustrate another embodiment. In FIGS. 4-6, same reference numerals illustrate same portions of FIGS. 1-3.

According to the second embodiment, especially portions 3b and 3c of lateral partition wall 3 are projected inwardly toward said fingertip recess and have a substantially same protrusion height with the microscope slide-retaining means, as seen in FIG. 5.

By cutting off lateral partition walls 3b and 3c (hatched in FIGS. 4 and 5) by means of a knife or a pair of scissors, etc., a plurality of rectangular recesses 5 can be connected through said cut-off portion in longitudinal direction of filing sheet 1, so that microscope slides of different sizes can easily be inserted and retained within filing sheet 1 without considerably decreased strength of filing sheet 1.

In the present invention, side wall portions 3b and 3c have machine stitches, streaks, stripes, grooves, pressed streaks or the like provided in side wall portions 3b and 3c so as to facilitate cutting off thereof from filing sheet 1.

When it is desired to insert microscope slide 4a of an enlarged size of 3×3 inch, hatched portions of lateral partition walls 3 are cutting off, and then enlarged size of microscope slide 4a is inserted into three rectangular recesses by slightly lifting rear end of a longitudinal side of microscope slide 4a and pushing microscope slide 4a into said connected rectangular recesses, thus the microscope slide 4a can securely be retained in filing sheet 1. Filing sheet 1 need not to provide with larger size rectangular recesses 5 for exclusive use of larger size microscope slides, because frequency of using microscope slides of larger size is about 2% at most and there are various sizes of microscope slide such as 1.5×1 inch, 2×1 inch, 3×3 inch and the like so that it is difficult to expect what size of microscope slide will be necessitated and it is not economical to provide in advance rectangular recesses of larger size for exclusive use of microscope slide of larger sizes.

When newly prepared microscope slide 4, 4a wherein sampling is just finished and adhesive is not yet cured and cover glass is still liable to shift is inserted into filing sheet 1 for drying and two or more filing sheets 1 and stacked in a superposed fashion, spacer means 5d provided on bottom plane 5a of rectangular recess 5 abut on lower microscope slide 4, 4a at outside portion of viewing area of microscope as seen in FIG. 6, so that there is no fear of prepared sample and cover glass being contaminated or damaged.

In the present invention, since fingertip recess 7 is provided in borderline of adjacent rectangular recesses, the inserted microscope slide 4, 4a can easily be taken out from filing sheet 1, by grasping microscope slide 4, 4a from its longitudinal sides at fingertip recess 7 and then lifting inserted rear end side, namely, upper side in FIG. 4, of microscope slide 4, 4a to such a height that it can pass over upwardly projected portion 3a of lateral partition wall 3 against strength of microscope slide-retaining means 6, and pulling out microscope slide 4, 4a from rectangular recess in a direction inverse to arrow A of FIG. 5.

The filing sheet according to the present invention is readily obtained from an integral plastic sheet by a press process and hence easy and less costly to manufacture. Furthermore, the filing sheet allows a number of microscope slides to be kept in one filing sheet in an extremely compact way as well as to be held without a risk of being slipped off. The insertion and removal of microscope slides into and from the rectangular recesses of the filing sheet and the probing of a desired microscope slide are facilitated.

Microscope slides of different sizes can easily be arranged and reserved in one filing sheet upon request.

A number of filing sheets, wherein newly prepared microscope slides wherein sampling are just finished and adhesive are not yet cured and cover glasses are still liable to shift are retained, can easily be stacked in a compact formulized superposed fashion without contamination or breakage of the prepared samples.

Microscope slides retained in the filing sheet according to the present invention can be directly seen under microscope slide projector without overheating by light source of slide projector.

The filing sheet according to the present invention has excellent air ventilation property and prevents deterioration of sample prepared on microscope slides.

What is claimed is:

1. A filing sheet for microscope slides, wherein a number of microscope slides are held in laterally and vertically spaced relationship on the same plane of an integral sheet, comprising:
   a unitary plastic sheet having a plurality of rectangular recesses depressed from the outer periphery and spaced apart by longitudinal partition walls and lateral partition walls in lateral and longitudinal relationship, each of said rectangular recesses being defined by a pair of longitudinal partition walls and a pair of lateral partition walls for receiving a microscope slide;

microscope slide-retaining means projected inwardly into said rectangular recess from a shorter pair of opposing side walls which define said rectangular recess and having a space for inserting a microscope slide between the end of said slide-retaining means and an opposite lateral partition wall and being arranged so as to be inclined downwardly toward the bottom of the recess such that said slide is retained beneath said retaining means;

an air-ventilation opening provided on a side portion of the plane of said rectangular recesses under said slide-retaining means;

fingertip recesses provided in borderlines of adjacent rectangular recesses and protruded downwardly from the plane of said rectangular recess;

upraised projection means arranged on the bottom of each of said rectangular recesses for abutting said microscope slide and for holding said microscope slide in contact with said microscope slide-retaining means and being located on the periphery of said slide adjacent said side walls;

spacer means protruded downwardly from portions of the back surface of a bottom wall of said rectangular recess and being located on the periphery of said slide adjacent said side walls so as not to disturb viewing of a microscope slide; and a plurality of lateral partition walls projected inwardly toward said fingertip recess and having a substantially same protrusion height with the microscope slide retaining means.

2. A filing sheet for microscope slides, wherein a number of microscope slides are held in laterally and vertically spaced relationship on the same plane of an integral sheet, comprising:

a unitary plastic sheet having a plurality of rectangular recesses depressed from the outer periphery and spaced apart by longitudinal partition walls and lateral partition walls in lateral and longitudinal relationship, each of said rectangular recesses being defined by a pair of longitudinal partition walls and a pair of lateral partition walls for receiving a microscope slide;

microscope slide-retaining means projected inwardly into said rectangular recess from a shorter pair of opposing walls which define said rectangular recess and having a space for inserting a microscope slide between the end of said slide-retaining means and an opposite lateral partition wall and being arranged so as to be inclined downwardly toward the bottom of the recess such that said slide is retained beneath said retaining means;

an air-ventilation opening provided on the side portion of the plane of said rectangular recesses under said slide-retaining means;

fingertip recesses provided in borderlines between adjacent rectangular recesses and protruded downwardly from the plane of said rectangular recess;

upraised projection means arranged on the bottom of each of said rectangular recesses for abutting said microscope slide and for holding said microscope slide in contact with said microscope slide-retaining means and being located on the periphery of slides adjacent said side walls;

spacer means protruded downwardly from end portions of the back surface of a bottom wall of said rectangular recess and being located on the periphery of said slide adjacent said side walls so as not to distrub viewing of microscope slides;

a plurality of lateral partition walls projecting inwardly toward said fingertip recess and having a substantially same protrusion height with the microscope slide-retaining means; and wherein each of said lateral partition walls projected toward said fingertip recess has severable means for cutting off along a connecting line with said slide-retaining means so as to facilitate removal of said partition wall to connect thereby adjacent rectangular recesses to each other to form an enlarged rectangular recess.

3. A filing sheet for microscope slides as defined in claim 1, further comprising;

an index portion provided in one marginal portion of said filing sheet; and holes provided in the other marginal portion of said filing sheet for binding a plurality of said filing sheets together.

4. A filing sheet for microscope slides as defined in claim 2, wherein said severable portions of the lateral partition walls have severable means such as machine stitches, streaks, stripes, grooves, pressed forms, so as to facilitate separation thereof from the plastic sheet.

5. A filing sheet for microscope slides as defined in claim 1, wherein said spacer has longer length than the fingertip recess to prevent contact of lower end of the fingertip recess with the upper surface of a lower microscope slide of a larger size when two or more filing sheets are stacked in a superposed fashion and at least one microscope slide of larger size is retained in a lower filing sheet.

6. A filing sheet for microscope slides as defined in claim 1, wherein said fingertip recess is as deep as being fitted in a fingertip recess in a lower filing sheet when two or more filing sheets are stacked in a superposed fashion.

7. A filing sheet for microscope slides as defined in claim 1, further comprising;

two or more positioning members provided in desired portions of said filing sheet and adapted to engage the back surface of an upper filing sheet when two or more filing sheets are stacked in a superposed fashion.

8. A filing sheet for microscope slides as defined in claim 1, wherein said microscope slide-retaining means has elastic force sufficient to retain said microscope slide in said rectangular recess with said upraised projection means.

9. A filing sheet for microscope slides as defined in claim 1, wherein said microscope slide-retaining means are arranged so as to be inclined downwardly toward the bottom of the rectangular recess.

10. A filing sheet for microscope slides as defined in claim 1, wherein said filing sheet is made of transparent or translucent plastic material.

11. A filing sheet for microscope slides as defined in claim 1, wherein said upraised projection means are horizontally and vertically spaced from edges of said microscope slide-retaining means so that pressure is exerted at different points on opposite surfaces of a slide held in a recess.

12. A filing sheet for microscope slides as defined in claim 1, wherein at least a portion of said fingertip recesses is horizontally and vertically spaced from edges of said microscope slide-retaining means.

* * * * *